US012562995B2

(12) United States Patent
Biederman et al.

(10) Patent No.: US 12,562,995 B2
(45) Date of Patent: Feb. 24, 2026

(54) EGRESS PACKET SCHEDULING

(71) Applicant: Intel Corporation, Santa Clara, CA (US)

(72) Inventors: Daniel Christian Biederman, Saratoga, CA (US); Jin Yan, Sunnyvale, CA (US); Ho-Ming Leung, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 855 days.

(21) Appl. No.: 17/535,419

(22) Filed: Nov. 24, 2021

(65) Prior Publication Data

US 2022/0086100 A1      Mar. 17, 2022

(51) Int. Cl.
*H04L 47/62* (2022.01)

(52) U.S. Cl.
CPC ...... *H04L 47/6215* (2013.01); *H04L 47/6225* (2013.01)

(58) Field of Classification Search
CPC . H04L 47/6215; H04L 47/6225; H04L 47/58; H04L 47/564
See application file for complete search history.

(56) References Cited

U.S. PATENT DOCUMENTS

2006/0230119 A1* 10/2006 Hausauer ............ H04L 47/6265
                                                            709/216
2010/0061390 A1* 3/2010 Godbole ................ H04L 47/26
                                                            370/412
2011/0261686 A1 10/2011 Kotha et al.
2013/0223243 A1* 8/2013 Dhanapal .............. H04L 69/321
                                                            370/252
2018/0212885 A1* 7/2018 Contavalli .............. H04L 47/28
2018/0351861 A1 12/2018 Vasudevan et al.

OTHER PUBLICATIONS

Extended European Search Report for Patent Application No. 22202334.3, Mailed Mar. 4, 2023, 9 pages.
Alibaba Cloud, "Differences between SRR, WRR, DWRR, WDRR, and SDWRR Scheduling Algorithms", https://topic.alibabacloud.com/a/differences-between-srr-wrr-dwrr-wdrr-and-sdwrr-scheduling-algorithms_8_8_32012955.html, Last updated Dec. 2018, 2 pages.
IEEE Std 802.1 Qbv™-2015, "Amendment 25: Enhancements for Scheduled Traffic", IEEE SA-Standards Board, Dec. 2015, 57 pages.

* cited by examiner

*Primary Examiner* — Siming Liu
(74) *Attorney, Agent, or Firm* — Compass IP Law PC

(57)      ABSTRACT

Examples described herein relate to a network interface device. The network interface device can include circuitry to select a packet for transmission from among at least one time-based queue and at least one priority-based queue based on a departure time stamp value associated with the packet and a current time value. The network interface device can include circuitry to cause transmission of the selected packet. The circuitry can select a packet for transmission from the at least one time-based queue based on the current time value and based on the associated departure time stamp value.

20 Claims, 6 Drawing Sheets

CONFIGURE NETWORK INTERFACE DEVICE TO SELECT A PACKET FROM A
TIME BASED QUEUE OR A NON TIME BASED QUEUE
402

SELECT NEXT PACKET FOR TRANSMISSION FROM ONE OR MORE QUEUES
450

ALLOCATE PACKET TO FIFO IN NETWORK INTERFACE DEVICE
452

Descriptors and packets

Interrupts

Interface 512

FPGAs 530

DMA engine 552

Descriptor queues 520

Processors 504

Receive queue 508

Interrupt coalesce 522

Memory 510

Transmit traffic manager 507

Transmit queue 506

Packet allocator 524

MAC 516

PHY 514

Transceiver 502

Port   Port   Port   Port   Port   Port   Port

500

600

EGRESS PACKET SCHEDULING

BACKGROUND

At a network interface controller (NIC), packets can be scheduled for transmission at particular times. However, shaping the transmission of packets for multitudes of flows at prescribed rates for various network applications (e.g., video streams on a video server) with parallel and hierarchical layers of traffic shaping topologies can be a processor-intensive task, particularly where a flow can be shaped over multiple hierarchical aggregation stages with nodes in each stage shaped in parallel. On a server, processor cycles utilized for packet scheduling and shaping reduce the processor cycles available for other applications.

DETAILED DESCRIPTION

Figure 1:
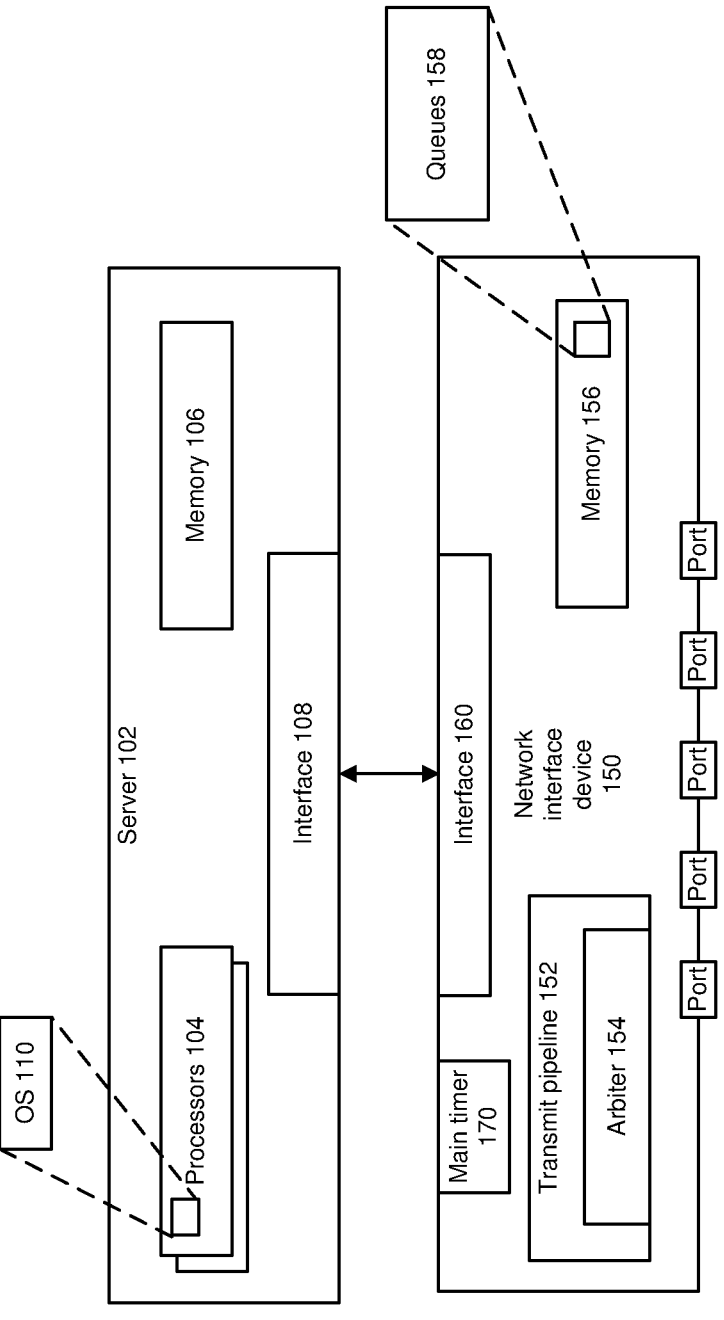
FIG. 1 depicts an example system.

Institute of Electrical and Electronics Engineers (IEEE) standard 802.1Qbv-2015 specifies standards for Time-Sensitive Networking (TSN). In addition, Society of Motion Picture and Television Engineers (SMPTE) ST 2110-21 (ST 2110-21:2017-SMPTE Standard-Professional Media Over Managed IP Networks: Traffic Shaping and Delivery Timing for Video) requires packet transmission at scheduled times. Latencies associated with fetching a packet body, encrypting the packet, and scheduling the packet for transmission in Egress Class of Service (CoS) Queues (ECQ) can make compliance with IEEE 802.1Qbv or SMPTE ST 2110-21 challenging. In addition, transmission pausing schemes such as (e.g., IEEE 802.3x) and Priority Based Flow Control (PFC) (e.g., IEEE 802.1Qbb) can pause transmission of packets from a port or associated with a traffic class and inhibit scheduling transmission of time sensitive packets, or force certain traffic classes to be designated as time sensitive traffic.

Some examples provide for traffic shaping according to different modes. A first mode can be pacing network traffic according to a defined rate policy. A second mode can be arbitrating packet traffic based on packet priority classes or ports. Some examples provide egress packet scheduling for a port that considers time stamp-based packet selection as well as priority or non-time based packet selection based on one or more of: round robin (RR), Deficit Round Robin (DRR), Deficit Weighted Round Robin (DWRR), Prioritized Elastic Round Robin (PERR), weighted fair queuing (WFQ), Strict Priority, or others. RR arbitration can select a port (e.g., physical or logical) so that different ports are served sequentially an allocation of bandwidth for packet transmission. Strict Priority can be allocated a priority to one or more of ports, so that the highest priority port is serviced before lower priority port(s) to allocate certain time critical ports priority over other ports. Accordingly, a network interface device can support egress scheduling based on priority or non-time based schemes, as well as time-based egress scheduling and meet the TSN 802.1Qbv or SMPTE ST 2110-21 requirements.

Some examples allow TSN packet requirements to supersede requirements of pause or flow control (e.g., IEEE 802.3x or IEEE 802.1Qbb) by ignoring the Pause or PFC commands. For example, when a port or a queue should not transmit under IEEE802.3 or IEEE 802.1Qbb, the time based queue would have precedence and the do not transmit condition can be not considered even if the queue is subject to pause. Despite a pause message with a pause time duration targeting a particular queue, packets can be scheduled for egress from the particular queue before an expiration of the pause time duration.

A traffic shaper of a network interface device can allow for packets to be placed in a scheduling egress queue prior to retrieving the packet from a host or server memory. A scheduling egress buffer can include packets, headers of packets, or metadata. Thus, if there are unpredictable latencies from accessing packets from host memory, jitter between traffic shaper timing slots (e.g., variation among temporal slot intervals) and/or jitter in a data path to selection of a packet for transmission, a traffic pattern from a port output may have a jitter or unpredictable latency. A data path can include a traffic shaper, packet builder, host memory, media access control (MAC), physical layer interface (PHY), and serializer/de-serializer (SERDES) to transmission media. Some examples can remove or reduce unpredictable latencies from accessing packets from host memory and jitter between transmit time slots by giving priority or attempting to provide a level of fairness to certain packets with transmit time stamp requirements.

Reorder resilient transports may utilize examples described herein to keep packet transmit times within accepted margins. Examples can perform packet pacing, such as for media streaming applications based on streaming protocols. Streaming protocols can include Real Time Streaming Protocol (RTSP), H.323, Session Initiation Protocol (SIP), Jingle (XMPP), or others. In SMPTE ST 2110-21, the "Network Compatibility Model" in section 6.6.1 specifies a fixed inter-packet gap per RTSP flow.

FIG. 1 depicts an example system. Server 102 can include or access one or more processors 104, memory 106, and device interface 108, among other components described herein (e.g., accelerator devices, interconnects, and other circuitry). Processors 104 can execute one or more applications (e.g., microservices, virtual machines (VMs), containers, or other distributed or virtualized execution environment) that utilize or request paced transmission of packets using transport technologies such as Transmission Control Protocol (TCP), User Datagram Protocol (UDP), quick UDP Internet Connections (QUIC), RDMA over Converged Ethernet (RoCE), or other protocols. In some examples, one or more processors 104 can request network interface device 150 to transmit one or more packets and utilize packet transmission scheduling described herein.

Departure times of packets can be decided by software (e.g., an application, hypervisor, device driver and/or software executing on network interface device 150 (e.g., data plane software and/or control plane software). The application may command the device driver to send an amount of data, and the device driver can pace out transmission of the data as smaller chunks of data. The application could be running on server 102 or on network interface device 150. The CPU could offload full packet transmission to network interface device 150.

In some examples, software could identify a transmit time slot, and transmit pipeline 152 could schedule an egress time based on worst case access time to host memory and/or other data path latencies.

Referring to network interface device 150, transmit pipeline 152 can select a packet transmission through one or more ports. In some examples, arbiter 154 can assign packets from queues 158 stored in memory 156, or packet buffer in memory 106, for transmission. Memory 156 can be implemented as a volatile memory device including a cache (e.g., Level 1 (L1), Level 2 (L2), Level 3 (L3), and/or last level cache (LLC)). Note that while memory 156 is shown as part of network interface device 150, memory 156 can be part of server 102 or another device.

Queues 158 can include one or more linked lists that store identifiers or metadata of egress packets ordered based on their transmission timestamps or packets that are not associated with egress time stamps. In some examples, one or more of queues 158 can be associated with a priority-based selection or non-timestamp-based scheme.

Arbiter 154 can select a packet for transmission based on transmit time stamp and selection of a packet from one or more of queues 158 based on allocated bandwidth from among multiple queues including one or more of: round robin (RR), Deficit Round Robin (DRR), Deficit Weighted Round Robin (DWRR), Prioritized Elastic Round Robin (PERR), weighted fair queuing (WFQ), Strict Priority, or others. Arbiter 154 can select a packet for egress from a port from one or more time-based queues and one or more non-time based queues among queues 158 based on a current time of main timer 170. The timestamp can represent an earliest departure time of a packet, and use of time stamps can help ensure that packets are not transmitted until a timer value is greater than or equal to a packet's timestamp.

Arbiter 154 can select a transmit time slot based on a packet's timestamp by either rounding up or down a timestamp value into a next slot. In some examples, if a packet timestamp is less than a current time and within a threshold amount of difference from the current time, the packet can be selected for transmission. In some examples, if a packet timestamp is less than a current time by more than a threshold level of difference, the packet can be counted as transmitted and dropped. In some examples, if a packet arrives in a time-based queue after its departure time, arbiter can cause the packet to be sent immediately. For example, arbiter 154 can select a packet for egress based on transmission time being equal to or less than a current time of main timer 170 to override Strict Priority to let a lower priority queue with time stamp-based packets be sent over a packet in a higher priority traffic class (TC) queue. In other words, if a transmit time stamp for a packet is less than or equal to a current time of main timer 170, the packet is assigned a highest quality of service, and selected for egress next.

In some examples, arbiter 154 can allow a packet whose time is scheduled to be transmitted to wait until (1) credits are available or (2) a programmable additional time has passed. Arbiter 154 can select a batch of multiple packets for transmission based on batch selection that uses the departure time of at least one packet in the batch in the scheduling decision of that batch. Arbiter 154 could test the requested transmission time of the head of the queue to confirm it is within a scheduled time frame to avoid blocking a queue due to a departure time of infinity. With multiple time-based queues, priority order could be determined based on which packet is nearest to the current time of the main timer first.

In some examples, to send a packet at 1 μs (+/−100 ns) time slots, such packet can be sent if the main timer value≥head of queue packet's departure time stamp minus a threshold value of 100 ns. This could also allow the packet to depart even if there is a jumbo frame in front of it. For example, to send a packet at 1 μs (+/−100 ns) time slots, multiple comparisons to the main timer can be made such as (1) if main timer≥head of queue packet's departure time minus a threshold value of 200 ns, prepare to send this packet but do not schedule it to be sent (e.g., fetch the packet data from memory and allocate the packet to an output first in first out (FIFO) queue by placing the packet on top of the queue to be sent next or delay other packets, as it will conflict in sending this packet out at the appropriate time); (2) if main timer≥head of queue packet's departure time minus a threshold value of 100 ns, schedule the packet to be sent packet; (3) if main timer≥head of queue packet's departure time plus a threshold value of 50 ns, schedule this packet at a highest priority of all timing queues. Threshold time values such as −200, −100, +50 ns can be programmable by a driver or operating system. Other threshold values can be used.

Some examples apply strict adherence to the departure time to schedule a packet to be sent at its departure time versus best efforts, or scheduling a packet for transmission before its departure time. For example, in video, packet pacing is applied to avoid the packet from leaving too early (to avoid overflowing the receiver's buffer) or too late (to hurt the quality of the video).

Time based queues can be allocated in memory and packets can be sorted and allocated to these queues based on their expected departure time. If there are multiple time based queues, a packet can be moved to a queue that would be associated with a correct departure time. For example, for smaller sized packets that are not to be fetched from a host, and large packets that are to be fetched from the host, then the following scheme could be used to associate packets with queues. Queue1 can fill up with small packets in order of departure time, Queue2 can fill up with larger packets based on order of departure time and likely having an earlier departure time than Queue 1). Queue N can store packets whose transmit time has passed and such packets can be sent as soon as possible.

The following depicts potential pseudocode of operation of arbiter 154.

```
If departure time < current time
    Place packet in queue N
Else
For i = 1 to N-1
If departure time <queue (i) {
    Queue(i) <- Packet
    Return;}
    End loop
    Queue (with lowest error) <- Packet //Packet would be out of
    timing order
End if
```

For a real time workload, in some cases, all queues can be timing-based queues. Hence N=8 or 10, or other values.

If there is no packet with a transmit time stamp that is at or less than a current time of main timer 170, then arbiter 154 can select a packet from a queue using a bandwidth allocation technique or non-timestamp based scheme such as one or more of: round robin (RR), Deficit Round Robin (DRR), Deficit Weighted Round Robin (DWRR), Prioritized Elastic Round Robin (PERR), weighted fair queuing (WFQ), Strict Priority, or others.

A flow can be a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content-based services (e.g., load balancer, firewall, intrusion detection system, etc.), flows can be discriminated at a finer granularity by using N-tuples (e.g., source address, destination address, IP protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

Network interface device 150 can be implemented as one or more of: a network interface controller (NIC), a remote direct memory access (RDMA)-enabled NIC, SmartNIC, router, switch, forwarding element, infrastructure processing unit (IPU), data processing unit (DPU), or network-attached appliance (e.g., storage, memory, accelerator, processors, security), and so forth. Network interface device 150 can be communicatively coupled to interface 108 of server 102 using interface 160. Interface 108 and interface 160 can communicate based on Peripheral Component Interconnect Express (PCIe), Compute Express Link (CXL). See, for example, Peripheral Component Interconnect Express (PCIe) Base Specification 1.0 (2002), as well as earlier versions, later versions, and variations thereof. See, for example, Compute Express Link (CXL) Specification revision 2.0, version 0.7 (2019), as well as earlier versions, later versions, and variations thereof.

Figure 2:
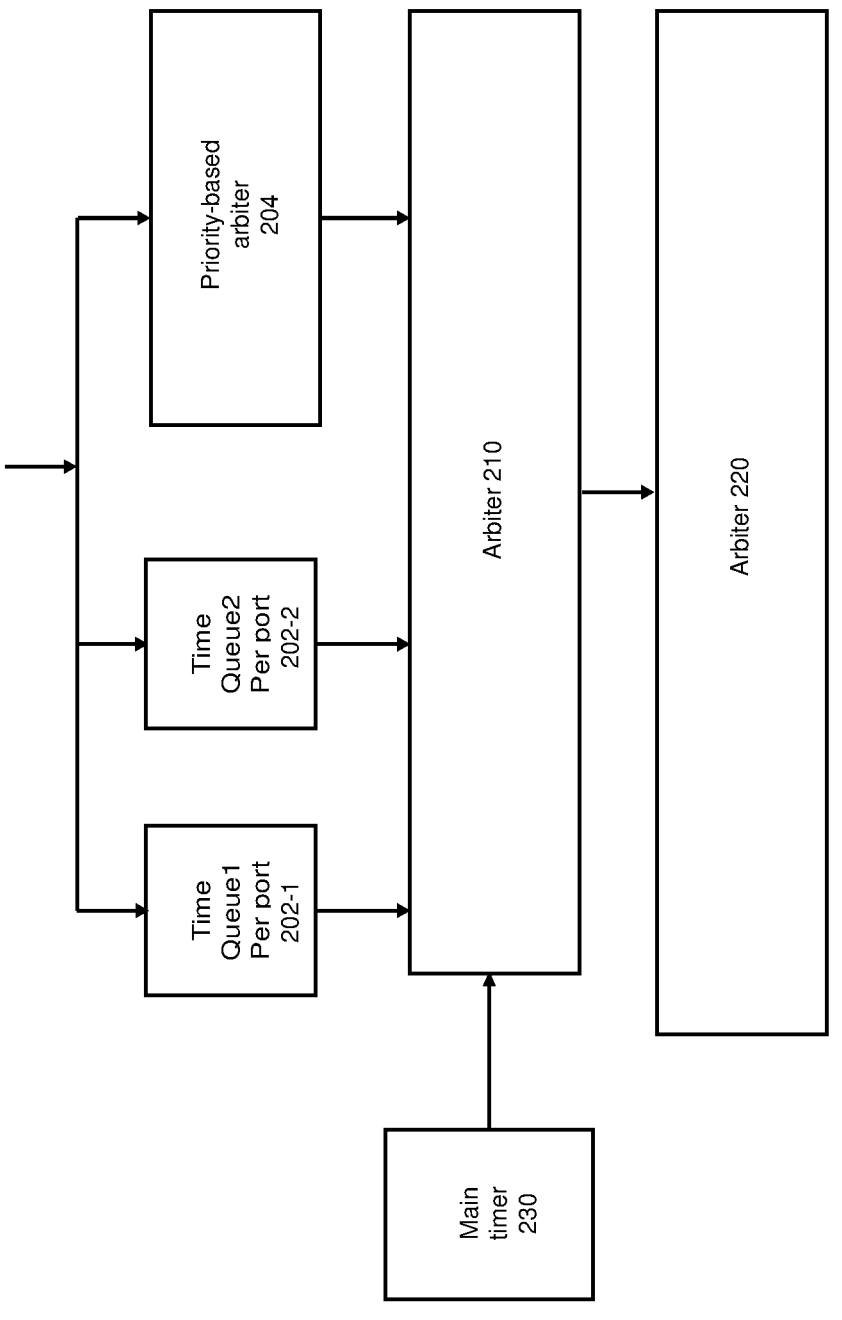
FIG. 2 depicts an example system.

FIG. 2 depicts an example system. Some examples merge multiple types of arbiters 204, 210, and 220 whereby time stamp considerations can override a higher priority level queue in deciding to egress a packet. Priority-based arbiter 204 can select a packet from a queue based on non-time stamp considerations such as priority and utilize schemes such as one or more of: round robin (RR), Deficit Round Robin (DRR), Deficit Weighted Round Robin (DWRR), Prioritized Elastic Round Robin (PERR), weighted fair queuing (WFQ), or Strict Priority. Arbiter 210 can decide to select a time-based queue entry, and deduct credits from a non-time-based queue's credits to allow fairness between the ports and traffic classes so that the overall credit consumption of the particular port is accounted for and this port would not be over-subscribed relative to other ports. In some examples, a port (or traffic class) may not receive more bandwidth, because it has both timed packets and normal packets compared to another port that just has normal packets.

Multiple levels of arbitration can be supported. In some examples, queues with packets scheduled for transmission based on time are Time Queue 1 202-1 and Time Queue 2 202-2. Time Queue 1 202-1 and Time Queue 2 202-2 can be allocated per port. Arbiter 210 can schedule packets for transmission based on the current time (e.g., Main Timer of a network interface device) and the departure time of the packet(s) at the head of the queue. Hence if the departure time of the packet in the Time Queues 202-1 to 202-2 is later than the current time from main timer 230, then it will pass arbiter 210 over the packets in the other non-timer based queues selected by arbiter 204 (e.g., scheduling protocol such as SP, RR, ERR, or DWRR). Note in this case, arbiter 220 is a time domain multiplexer (TDM) that rotates through the ports to select a packet to egress per TDM time slot.

Even though only 2 time queues are shown per port, there could be 1 or more than 2. Additionally, there could be more or less than 3 levels of arbitration.

If a flow associated with a time-based queue is paused, packets from the time queue may not dequeue for egress. Isolating time-based packets to a queue can avoid causing non-time based packets from being paused and limit effect of pause to a single flow and not other flows if such other flows are allocated to the time-based queue. In some examples, arbiter 154 can select a packet for transmission based on a departure time and ignore a pause command. In some examples, the pause command is a pause packet. In some examples, the pause command is a Priority Flow Control (PFC) packet.

In an example, two packets with a same traffic class can arrive at a queue such that the first packet arrives at the queue out of order due to jitter in the retrieval of the packet from the host interface. Yet the arbiter could send the packets with correct departure times, which would force a reordering of the packets. Examples allow more precise launch time control/traffic pacing.

Concerning pause frames, IEEE 802.3x and IEEE802.1Qbb specifications may be modified as follows. The specifications may provide a buffer designed for packets related to TSN scheduling. For example, the egress scheduler may not send over 10K bytes of TSN packets on a port before the pause is released, the egress scheduler may not send over a certain rate of TSN packets on a port before the pause is released, and/or the rate or number of bytes could be advertised. Some higher-level protocol could allow link-partners to share credits on Time-Based scheduling queues above the IEEE protocols. The specifications may define a class of traffic that could handle TSN packets regardless of the port's and/or traffic classes pause state.

Figure 3:
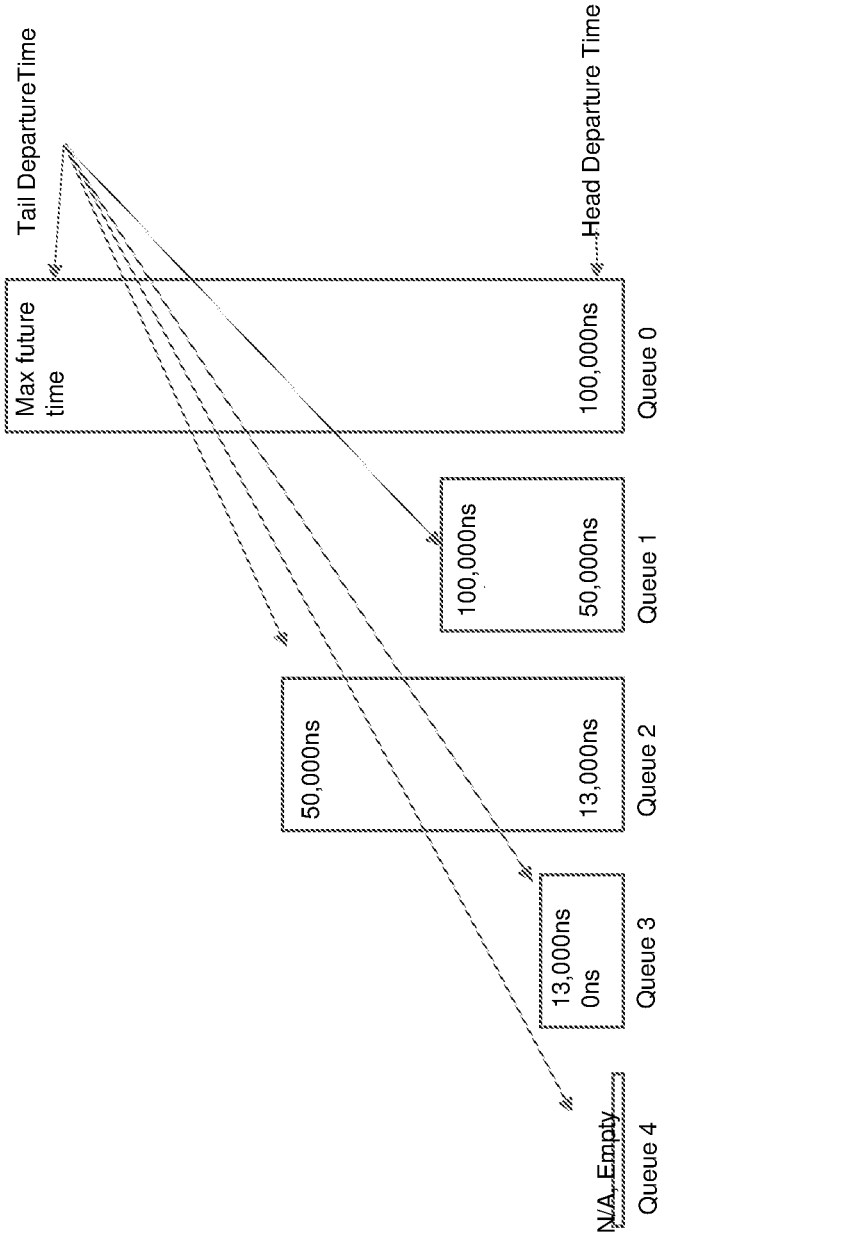
FIG. 3 depicts an example of queue utilization.

FIG. 3 depicts an example of queue utilization. Head departure time and tail departure time can represent respective nearer and further distances from a current main timer value. Queue 4 is empty in this example and not used. Queue 3 can store packets with Departure Time<13,000 ns. Queue 2 can store packets satisfying 13,000 ns≤Departure Time<50,000 ns. Queue 1 can store packets satisfying 50,000 ns≤Departure Time<100,000 ns. Queue 0 can store packets satisfying 100,000 ns≤Departure Time≤"Max future time." If a packet time stamp is beyond "Max future time," the network interface device could drop the associated packet, place the associated packet in another queue, interrupt an operating system to indicate the associated packet is to be dropped or has a time stamp that is outside of a range of accepted departure time stamps, and so forth. The time ranges of the queues can be changed depending on configurations set by a control plane or driver.

Figures 4A, 4B:
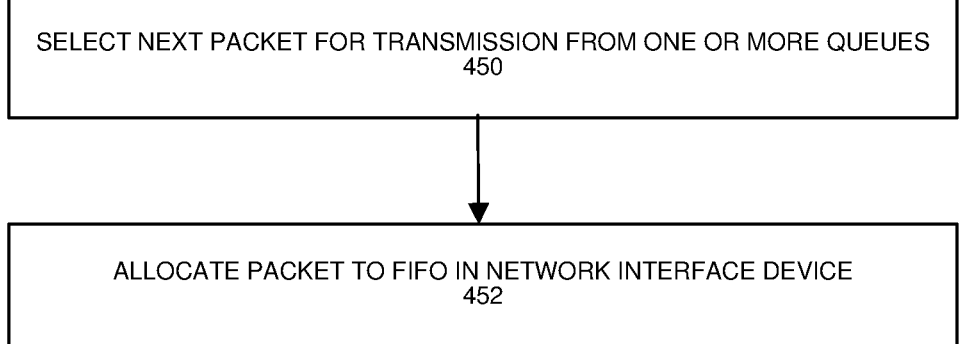
FIGS. 4A and 4B depict example processes.

FIG. 4A depicts an example process. The process can be performed by an operating system, driver, application, and/or firmware of a network interface device. At 402, a transmit scheduler of a network interface device can be configured to select a packet from a time based queue or a non-time based queue. In some examples, a non-time based queue can be a queue associated with one or more of strict priority, weighted round robin, and so forth.

FIG. 4B depicts an example process. The process can be performed by a network interface device. At 450, a transmit scheduler can select a packet for transit from a non-time based queue or a time based queue. For example, the transmit scheduler can select a packet for transmission or egress with a timestamp that is at or less than a current time. If no packet has a timestamp that is at or less than a current time, then a packet can be selected for transit from a non-time based queue in accordance with applicable packet selection criteria. Current time can be based on a clock source accessible to the network interface device. At 452, a packet can be allocated for transmission from a FIFO queue.

Figure 5:
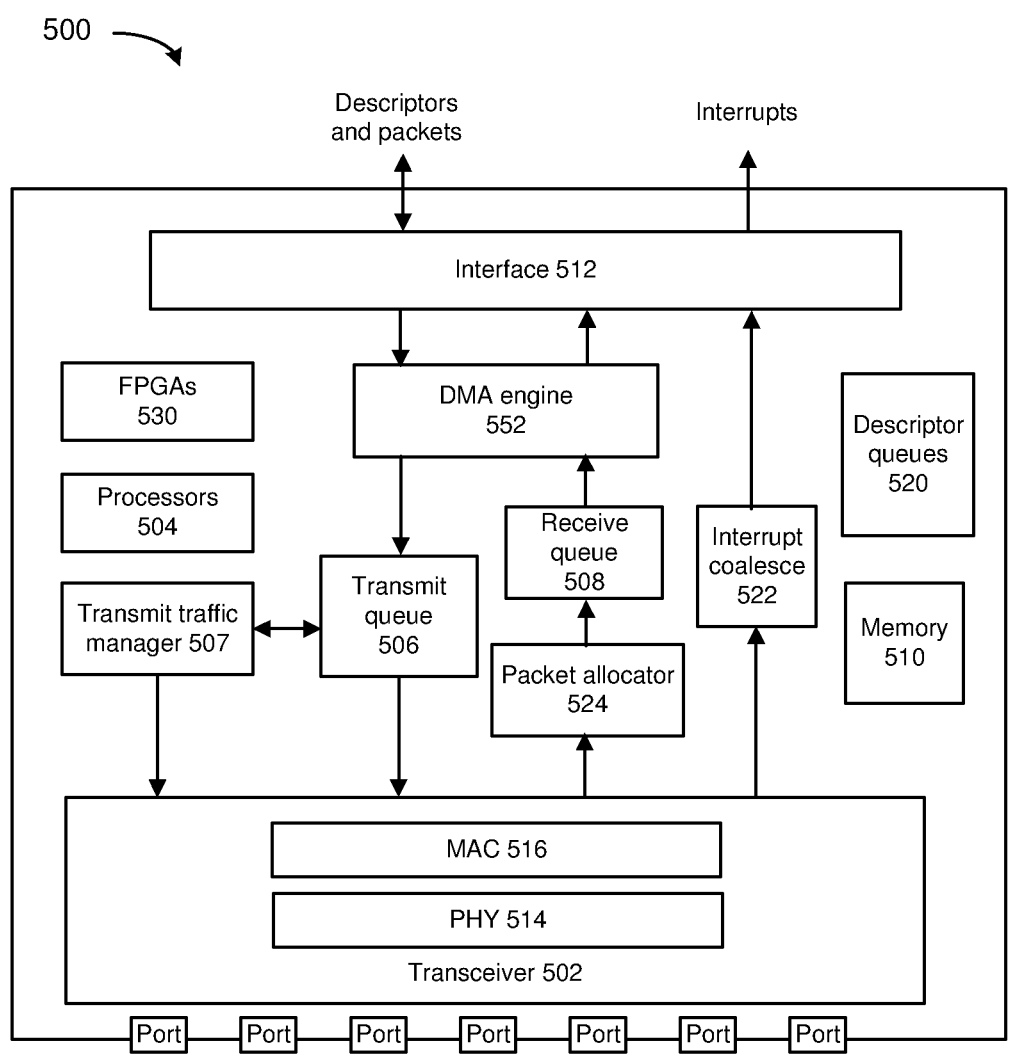
FIG. 5 depicts an example network interface device.

FIG. 5 depicts an example network interface device. Various processor resources in the network interface can packet transmission scheduling based on time or non-time based queues, as described herein. In some examples, network interface 500 can be implemented as a network interface controller, network interface card, a host fabric interface (HFI), or host bus adapter (HBA), and such examples can be interchangeable. Network interface 500 can be coupled to one or more servers using a bus, PCIe, CXL, or DDR. Network interface 500 may be embodied as part of a system-on-a-chip (SoC) that includes one or more processors, or included on a multichip package that also contains one or more processors.

Some examples of network device 500 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 500 can include transceiver 502, processors 504, transmit queue 506, receive queue 508, memory 510, and bus interface 512, and DMA engine 552. Transceiver 502 can be capable of receiving and transmitting packets in conformance with the applicable protocols such as Ethernet as described in IEEE 802.3, although other protocols may be used. Transceiver 502 can receive and transmit packets from and to a network via a network medium (not depicted). Transceiver 502 can include PHY circuitry 514 and media access control (MAC) circuitry 516. PHY circuitry 514 can include encoding and decoding circuitry (not shown) to encode and decode data packets according to applicable physical layer specifications or standards. MAC circuitry 516 can be configured to perform MAC address filtering on received packets, process MAC headers of received packets by verifying data integrity, remove preambles and padding, and provide packet content for processing by higher layers. MAC circuitry 516 can be configured to assemble data to be transmitted into packets, that include destination and source addresses along with network control information and error detection hash values.

For packets that are enqueued for transmission in transmit queue 506, transmit traffic manager 507 can perform performs the transmit scheduling, fine and coarse grain list management and migration, stacking, and cache eviction, as described herein.

Processors 504 can be any a combination of a: processor, core, graphics processing unit (GPU), field programmable gate array (FPGA), application specific integrated circuit (ASIC), or other programmable hardware device that allow programming of network interface 500. For example, a "smart network interface" or SmartNIC can provide packet processing capabilities in the network interface using processors 504.

Processors 504 can include a programmable processing pipeline that is programmable by Programming Protocol-independent Packet Processors (P4), C, Python, Broadcom Network Programming Language (NPL), or x86 compatible executable binaries or other executable binaries. A programmable processing pipeline can include one or more match-action units (MAUs) that can schedule packets for transmission using one or multiple granularity lists, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content.

Transmit traffic manager 507 can select a packet to allocate to a transmit time slot from among timestamp and/or non-timestamp based queues, as described herein. Transmit traffic manager 507 can be implemented as part of processors 504 and/or FPGAs 530.

Packet allocator 524 can provide distribution of received packets for processing by multiple CPUs or cores using receive side scaling (RSS). When packet allocator 524 uses RSS, packet allocator 524 can calculate a hash or make another determination based on contents of a received packet to determine which CPU or core is to process a packet.

Interrupt coalesce 522 can perform interrupt moderation whereby network interface interrupt coalesce 522 waits for multiple packets to arrive, or for a time-out to expire, before generating an interrupt to host system to process received packet(s). Receive Segment Coalescing (RSC) can be performed by network interface 500 whereby portions of incoming packets are combined into segments of a packet. Network interface 500 provides this coalesced packet to an application.

Direct memory access (DMA) engine 552 can copy a packet header, packet payload, and/or descriptor directly from host memory to the network interface or vice versa, instead of copying the packet to an intermediate buffer at the host and then using another copy operation from the intermediate buffer to the destination buffer.

Memory 510 can be any type of volatile or non-volatile memory device and can store any queue or instructions used to program network interface 500. Transmit queue 506 can include data or references to data for transmission by network interface. Receive queue 508 can include data or references to data that was received by network interface from a network. Descriptor queues 520 can include descriptors that reference data or packets in transmit queue 506 or receive queue 508. Bus interface 512 can provide an interface with host device (not depicted). For example, bus interface 512 can be compatible with or based at least in part on PCI, PCI Express, PCI-x, Serial ATA, and/or USB (although other interconnection standards may be used), or proprietary variations thereof.

Figure 6:
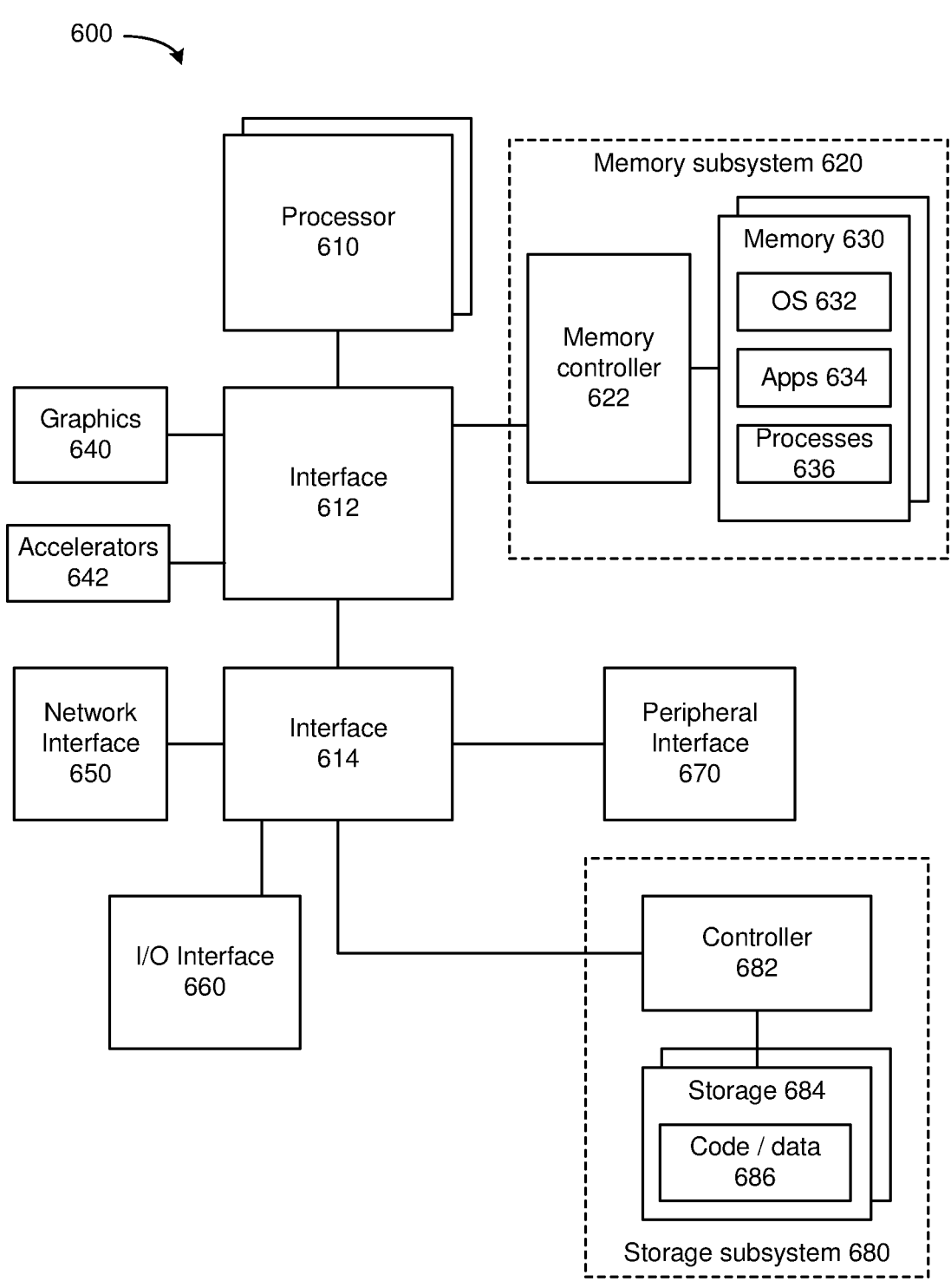
FIG. 6 depicts a system.

FIG. 6 depicts an example computing system. Components of system 600 (e.g., processor 610, network interface 650, and so forth) to schedule packets for transmission, as described herein. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function or programmable offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 642 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

In some examples, OS 632 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can configure network interface 650 to allocate packets for transmission from timestamp or priority based queues, as described herein. In some examples, a driver can enable or disable offload to network interface 650 of allocating packets for transmission from timestamp or priority based queues, as described herein. A driver can advertise capability of network interface 650 to perform one or more aspects of network interface 650 to allocate packets for transmission from timestamp or priority based queues, as described herein.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory.

Some examples of network interface 650 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR 4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

An example includes a network interface device that includes circuitry to select a packet for transmission based on a departure time that ignores a pause command. In some examples, the pause command is a pause packet. In some examples, the pause command is a Priority Flow Control (PFC) packet.

Example 1 includes one or more examples, and includes an apparatus comprising: a network interface device comprising: circuitry to select a packet for transmission from among at least one time-based queue and at least one priority-based queue based on a departure time stamp value associated with the packet and a current time value and circuitry to cause transmission of the selected packet.

Example 2 includes one or more examples, wherein the circuitry is to select a packet for transmission from the at least one time-based queue based on the current time value and based on the associated departure time stamp value.

Example 3 includes one or more examples, wherein the circuitry is to select a packet for transmission from the at least one time-based queue irrespective of pause or priority flow control being associated with the at least one time-based queue.

Example 4 includes one or more examples, wherein the network interface device comprises circuitry that is to drop the packet from a time-based queue based on the associated departure time stamp value and the current time value.

Example 5 includes one or more examples, wherein to select a packet for transmission from the at least one priority-based queue, the circuitry is to apply one or more of: round robin (RR), Deficit Round Robin (DRR), Deficit Weighted Round Robin (DWRR), Prioritized Elastic Round Robin (PERR), weighted fair queuing (WFQ), or Strict Priority.

Example 6 includes one or more examples, and includes a memory that, when operational, is to store packets associated with the at least one time-based queue or the at least one priority-based queue.

Example 7 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

Example 8 includes one or more examples, and includes a server to request transmission of the packet and indicate the associated departure time stamp value.

Example 9 includes one or more examples, and includes a datacenter comprising the server and a second server, wherein the network interface device is to pace packet transmission of the selected packet and a plurality of packets to the second server.

Example 10 includes one or more examples, and includes at least one computer-readable medium comprising instructions stored thereon, that if executed by one or more processors, cause the one or more processors to: configure a network interface device to: select a packet for transmission from among at least one time-based queue and at least one priority-based queue based on a departure time stamp value associated with the packet and a current time value.

Example 11 includes one or more examples, wherein network interface device is to select a packet for transmission from the at least one time-based queue irrespective of pause or priority flow control being associated with the at least one time-based queue.

Example 12 includes one or more examples, comprising instructions stored thereon, that if executed by one or more processors, cause the one or more processors to: configure the network interface device to: drop the packet from a time-based queue based on the departure time stamp value and the current time value.

Example 13 includes one or more examples, wherein to select a packet for transmission from the at least one priority-based queue, the network interface device is to apply one or more of: round robin (RR), Deficit Round Robin (DRR), Deficit Weighted Round Robin (DWRR), Prioritized Elastic Round Robin (PERR), weighted fair queuing (WFQ), or Strict Priority.

Example 14 includes one or more examples, wherein to select a packet for transmission from the at least one time-based queue based on the departure time stamp value and the current time value, the network interface device is to pace packet transmission.

Example 15 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

Example 16 includes one or more examples, and includes a method comprising: selecting, at a network interface device, a packet to allocate to a transmit time slot from among at least one timestamp-based queue and at least one priority-based queue based on a transmit time stamp associated with the packet and a current time stamp value.

Example 17 includes one or more examples, wherein the selecting, at a network interface device, the packet to allocate to a transmit time slot from the at least one timestamp-based queue comprises selecting the packet for transmission from the at least one timestamp-based queue based on the current time stamp value and the transmit time stamp.

Example 18 includes one or more examples, wherein the selecting, at a network interface device, the packet to allocate to a transmit time slot from the at least one timestamp-based queue is irrespective of pause or priority flow control being associated with the at least one timestamp-based queue.

Example 19 includes one or more examples, comprising: dropping the packet from a timestamp-based queue based on the transmit time stamp and the current time stamp value.

Example 20 includes one or more examples, wherein the selecting, at a network interface device, a packet to allocate to a transmit time slot from the at least one priority-based queue is based on one or more of: round robin (RR), Deficit Round Robin (DRR), Deficit Weighted Round Robin (DWRR), Prioritized Elastic Round Robin (PERR), weighted fair queuing (WFQ), or Strict Priority.

What is claimed is:

1. An apparatus comprising:
a network interface device comprising:
a direct memory access (DMA) circuitry;
a network interface;
a host interface; and
circuitry to select a packet for transmission from among at least one time-based queue and at least one priority-based queue based on a departure time stamp value associated with a packet assigned to the at least one time-based queue and a current time value, wherein the circuitry is to prioritize selection of the packet from the at least one time-based queue over selection from the at least one priority-based queue based on the current time value and a departure time stamp value of the packet assigned to the at least one time-based queue and circuitry to cause transmission of the selected packet.

2. The apparatus of claim 1, wherein the circuitry is to select a packet for transmission from the at least one time-based queue based on the current time value and based on the associated departure time stamp value.

3. The apparatus of claim 2, wherein the circuitry is to select a packet for transmission from the at least one time-based queue irrespective of pause or priority flow control being associated with the at least one time-based queue.

4. The apparatus of claim 1, wherein the network interface device comprises circuitry that is to drop the packet from a time-based queue based on the associated departure time stamp value and the current time value.

5. The apparatus of claim 1, wherein to select a packet for transmission from the at least one priority-based queue, the circuitry is to apply one or more of: round robin (RR), Deficit Round Robin (DRR), Deficit Weighted Round Robin (DWRR), Prioritized Elastic Round Robin (PERR), weighted fair queuing (WFQ), or Strict Priority.

6. The apparatus of claim 1, comprising a memory that, when operational, is to store packets associated with the at least one time-based queue or the at least one priority-based queue.

7. The apparatus of claim 1, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

8. The apparatus of claim 1, comprising a server to request transmission of the packet and indicate the associated departure time stamp value.

9. The apparatus of claim 8, comprising a datacenter comprising the server and a second server, wherein the network interface device is to pace packet transmission of the selected packet and a plurality of packets to the second server.

10. At least one non-transitory computer-readable medium comprising instructions stored thereon, that if executed by one or more processors, cause the one or more processors to:
configure a network interface device to:
select a packet for transmission from among at least one time-based queue and at least one priority-based queue based on a departure time stamp value associated with a packet assigned to the at least one time-based queue and a current time value, wherein the network interface device is to prioritize selection of the packet from the at least one time-based queue over selection from the at least one priority-based queue based on the current time value and a departure time stamp value of the packet assigned to the at least one time-based queue.

11. The at least one computer-readable medium of claim 10, wherein the network interface device is to select a packet for transmission from the at least one time-based queue irrespective of pause or priority flow control being associated with the at least one time-based queue.

12. The at least one computer-readable medium of claim 10, comprising instructions stored thereon, that if executed by one or more processors, cause the one or more processors to:
configure the network interface device to:
drop the packet from a time-based queue based on the departure time stamp value and the current time value.

13. The at least one computer-readable medium of claim 10, wherein to select a packet for transmission from the at least one priority-based queue, the network interface device is to apply one or more of: round robin (RR), Deficit Round Robin (DRR), Deficit Weighted Round Robin (DWRR), Prioritized Elastic Round Robin (PERR), weighted fair queuing (WFQ), or Strict Priority.

14. The at least one computer-readable medium of claim 10, wherein to select a packet for transmission from the at least one time-based queue based on the departure time stamp value and the current time value, the network interface device is to pace packet transmission.

15. The at least one computer-readable medium of claim 10, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

16. A method comprising:
selecting, at a network interface device, a packet to allocate to a departure time slot from among at least one timestamp-based queue and at least one priority-based queue based on a transmit departure time stamp associated with a packet assigned to the at least one timestamp-based queue and a current time stamp value, wherein the network interface device is to prioritize selection of the packet from the at least one timestamp-based queue over selection from the at least one priority-based queue based on the current time stamp value and a departure time stamp value of the packet assigned to the at least one timestamp-based queue.

17. The method of claim 16, wherein the selecting, at the network interface device, the packet to allocate to a departure time slot from the at least one timestamp-based queue comprises selecting the packet for transmission from the at least one timestamp-based queue based on the current time stamp value and the departure time stamp.

18. The method of claim 16, wherein the selecting, at the network interface device, the packet to allocate to a transmit time slot from the at least one timestamp-based queue is irrespective of pause or priority flow control being associated with the at least one timestamp-based queue.

19. The method of claim 16, comprising:

dropping the packet from a timestamp-based queue based on the departure time stamp and the current time stamp value.

20. The method of claim 16, wherein the selecting, at the network interface device, a packet to allocate to a transmit time slot from the at least one priority-based queue is based on one or more of: round robin (RR), Deficit Round Robin (DRR), Deficit Weighted Round Robin (DWRR), Prioritized Elastic Round Robin (PERR), weighted fair queuing (WFQ), or Strict Priority.

* * * * *